April 17, 1956     L. D. WANN     2,742,606
ELECTRICAL LOGGING APPARATUS
Filed Oct. 25, 1954     6 Sheets-Sheet 1

INVENTOR.
LAYMOND D. WANN
BY
Lloyd Trimble
ATTORNEY

INVENTOR.
LAYMOND D. WANN
BY
ATTORNEY

INVENTOR.
LAYMOND D. WANN
BY
Floyd Trimble
ATTORNEY

April 17, 1956

L. D. WANN 2,742,606

ELECTRICAL LOGGING APPARATUS

Filed Oct. 25, 1954

INVENTOR.
LAYMOND D. WANN
BY
Lloyd Trimble
ATTORNEY

April 17, 1956

L. D. WANN 2,742,606

ELECTRICAL LOGGING APPARATUS

Filed Oct. 25, 1954

INVENTOR.
LAYMOND D. WANN
BY
Floyd Trimble
ATTORNEY

United States Patent Office 2,742,606
Patented Apr. 17, 1956

2,742,606

ELECTRICAL LOGGING APPARATUS

Laymond D. Wann, Ponca City, Okla., assignor to Continental Oil Company, Ponca City, Okla., a corporation of Delaware Application October 25, 1954, Serial No. 464,478

6 Claims. (Cl. 324—10)

This invention relates to the art of well logging and more particularly deals with an apparatus suitable for well logging by which electrode spacing of a logging sonde may be varied as the diameter of the bore hole varies with depth during the logging run. Still more particularly, it pertains to an apparatus wherein the ratio electrode spacing-hole diameter remains constant.

The various methods of well logging, for example, natural potential, specific resistivity, gamma ray, and neutron logging are now well known; and their place has been established in the oil industry. It has been found that the accuracy of these logs is affected by the character of the fluid within the well bore hole as well as the variation in the volume of the fluid as indicated by the variations in the diameter of the well bore. In other words, the accuracy of these logs is dependent in part upon the character of the fluid within the well bore and variations in the volume of the fluid resulting from variations in the diameter of the well bore. If it is assumed that the hole diameter remains constant, errors are often present in the interpretation of the short space electric logs. It is therefore often necessary to run a section gauge log as a correction to the electric log. This is not satisfactory because, when a logging instrument or anything else is lowered into a deep well, there is an appreciable stretch of the cable. In deep wells, for instance, it has been found that this stretch of the cable amounts to between 5 and 25 feet depending upon a number of variables, such as weight of the logging instrument, the nature of the cable, the fluid velocity and density, etc.; hence, identical positions of two logging instruments lowered individually into a well are difficult to attain. Although the measuring device might indicate an apparent equal depth, the variations in actual level frequently differ as much as 10 or 15 feet, making it impossible to correlate accurately readings from this strata. The result is that many narrow vein oil deposits have been overlooked by failure to correlate logs of fluid characteristics and diameter of the well bore at the point of measurement.

The principal object of this invention is to provide an apparatus by which the spacing of electrodes of a logging sonde will be varied automatically with variations in the diameter of the well bore. It is another object of my invention to provide an apparatus which eliminates the necessity of a section gauge log correlation to electric logs and facilitates interpretation of the electric logs. It is another object of this invention to provide an apparatus wherein the electrode spacing to hole diameter ratio remains constant. Other objects and advantages reside in certain novel features of the arrangement, as will be apparent from the following description taken in connection with the accompanying drawings in which:

Figure 3:
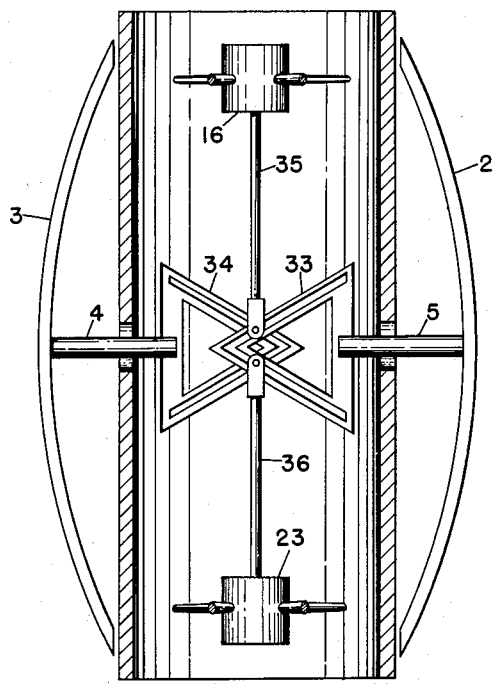
Figure 4:
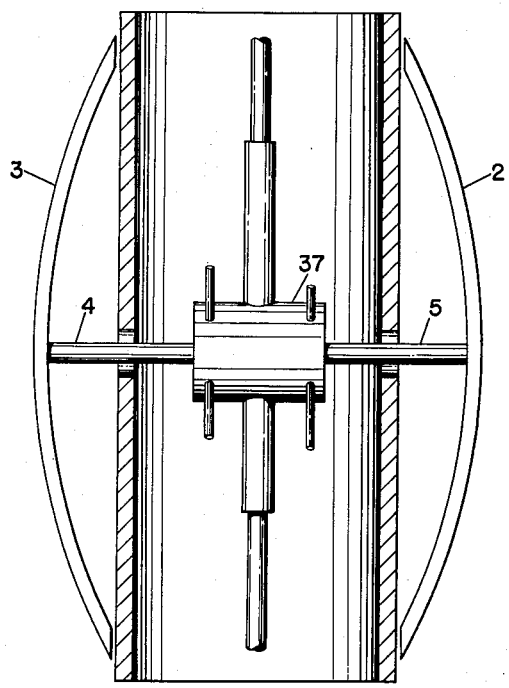
Figure 5:
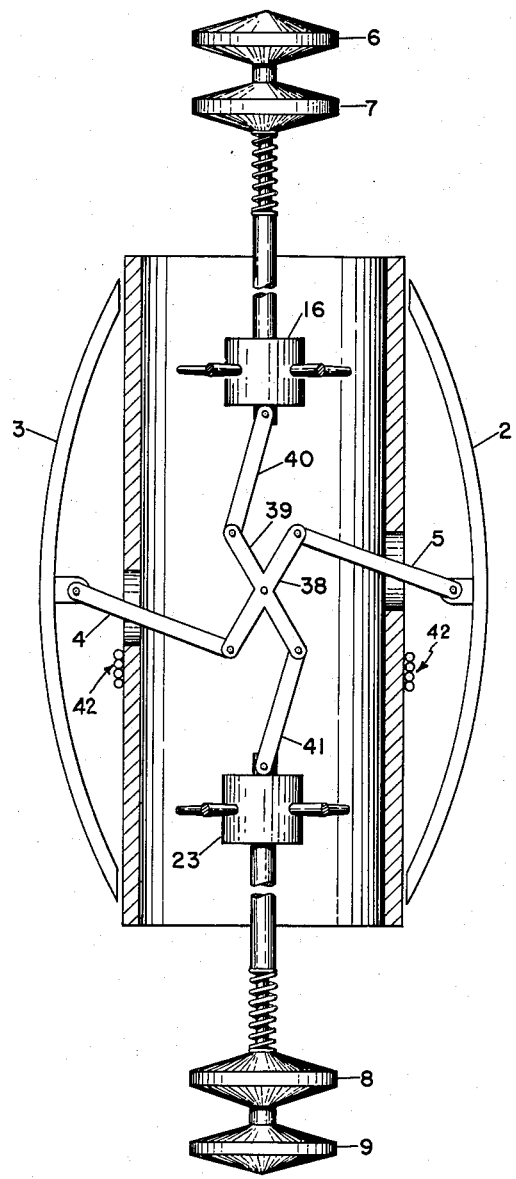
Figure 6:
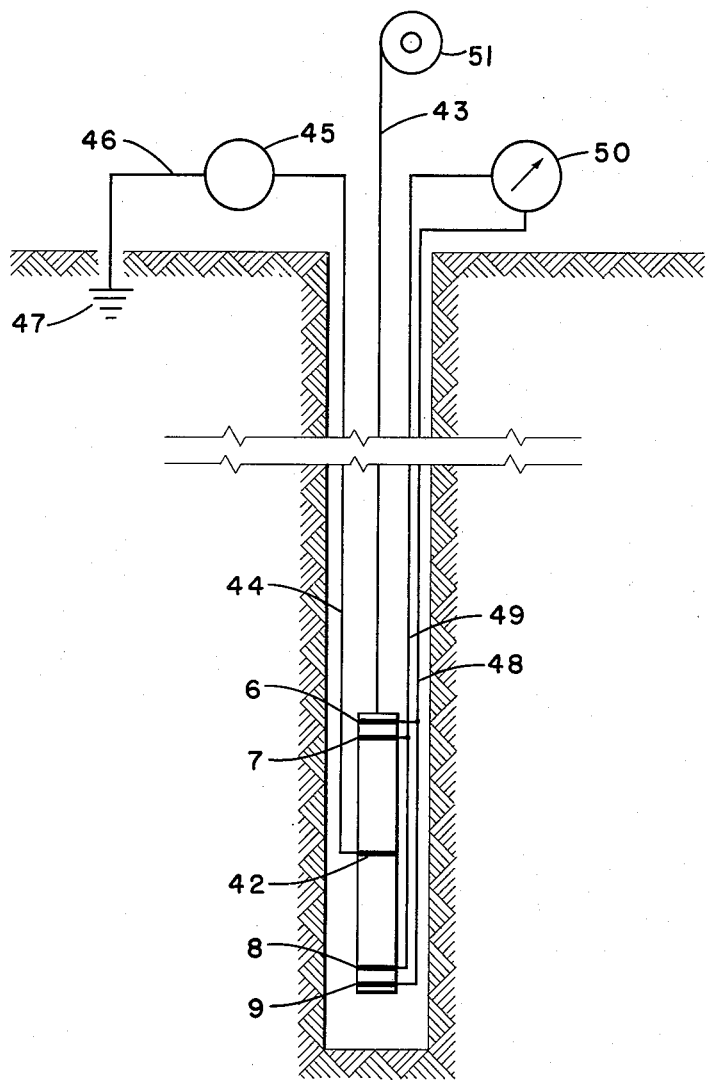
Figure 7:
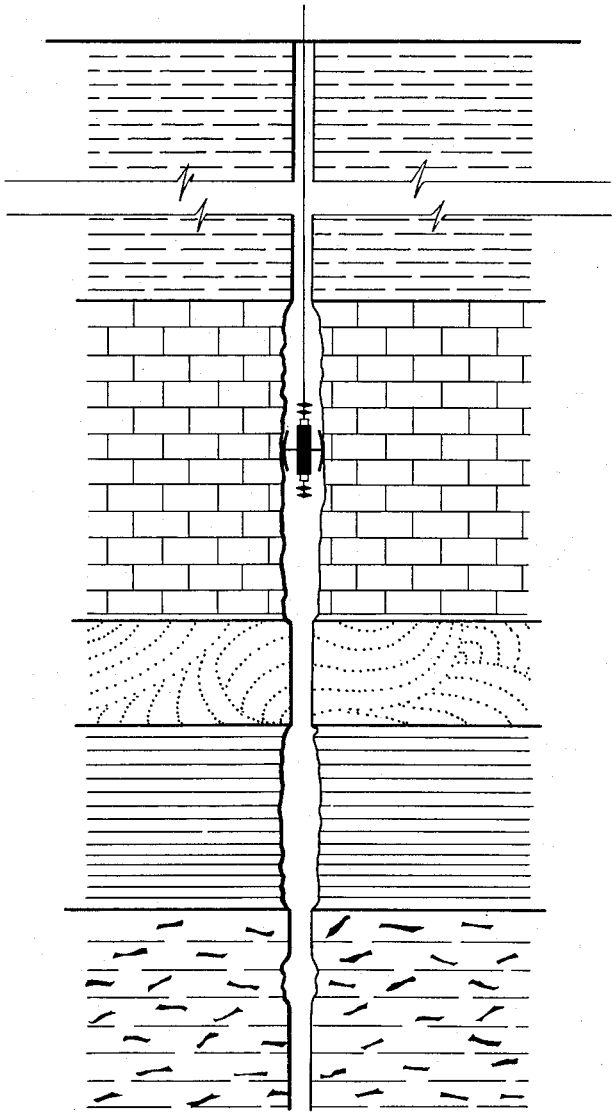

Figures 3, 4, and 5 are side views of other forms of the well logging device;

Figure 6 shows schematically an arrangement of the apparatus according to my invention, and a diagram of an electrical circuit incorporated in the features of the present invention;

Figure 7 is a schematic diagram showing the device in a well bore; and

Figure 8:
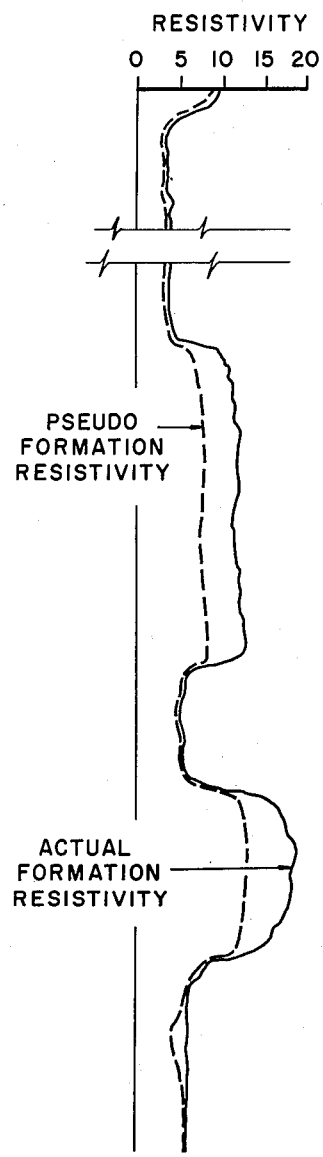

Figure 8 is a plot of resistivity determinations vs. depth of the well.

Figures 1, 2:
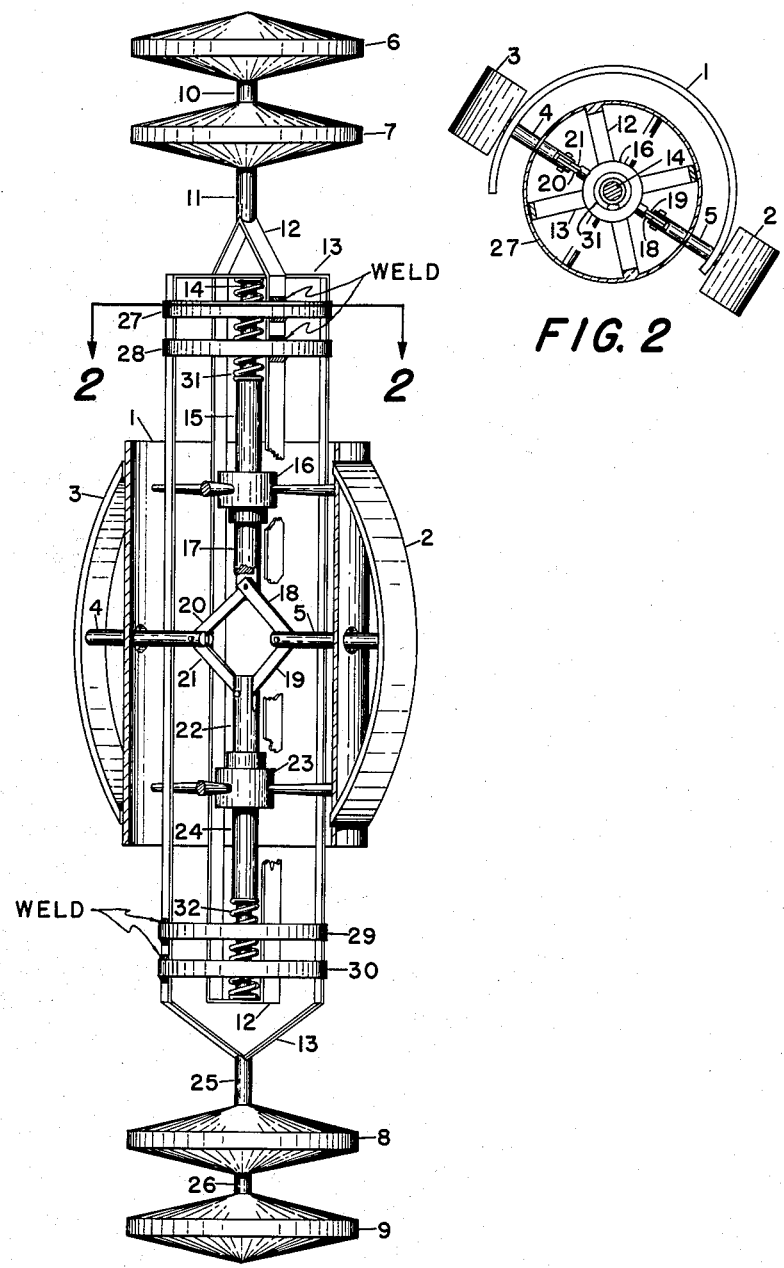
Figure 1 is a side view, partly in section, of one form of the well logging device.
Figure 2 is a section taken along the line 2—2 in Figure 1.

Referring to Figure 1, No. 1 denotes the frame of the sonde, which is cylindrical; and 2 and 3 are flexible guides which prevent the bore face from obstructing the passage of the instrument. As the apparatus moves down the bore hole, guides 2 and 3 contact the surface of the bore hole. If the diameter of the bore hole decreases, contact surfaces 2 and 3 move inward; and this movement is translated through rods 4 and 5 to the brackets 18, 19, 20, and 21, causing a corresponding movement in the hydraulic pistons 17 and 22. If the movement is as outlined, pistons 17 and 22 move toward hydraulic cylinders 16 and 23, respectively. This causes a corresponding outward movement of pistons 15 and 24. Frame 13 moves in the same direction as piston 15, and frame 12 moves in the same direction as piston 24. This causes movable electrodes 6, 7, and 8, 9 to be drawn closer together. If the contact surfaces 2 and 3 move outward because of a larger diameter bore hole, movable electrodes 6, 7, and 8, 9 move farther apart. The compression springs, 31 and 32, return the spacing to the larger value as the hole diameter increases. Bands 27 and 28 are attached to frame 12 and bands 29 and 30 are attached to frame 13. The hydraulic cylinders 16 and 23 are attached to the frame 1 of the sonde. Electrode 6 is electrically separated from electrode 7 by shaft 10 and the two are attached to frame 12 by means of the shaft 11. Likewise, electrode 9 is electrically separated from electrode 8 by shaft 26 and the two are attached to frame 13 by means of the shaft 25. All components of the sonde with the exception of the electrodes must be constructed of electrical nonconductive material or be thoroughly insulated.

Figures 3, 4, and 5 indicate alternate methods of accomplishing the 90 degree motion transfer. Wedge type levers 33 and 34 are illustrated in Figure 3 which may be used to change the direction of movement of the wall contacting surfaces by 90 degrees. Another method which may be used is a hydraulic cylinder 37 as illustrated in Figure 4. The latter is particularly useful where the size of the hydraulic cylinder does not exceed practical limits imposed by the hole diameter. Figure 5 exhibits a simplified design using the levers 38, 39, 40, and 41 for changing the direction of movement. This type would be most feasible with short spaced devices, the ratio electrode spacing to hole diameter being small.

Although mechanical means such as gears and levers could theoretically be used to translate the movement of the bore hole contacting surfaces 2 and 3 to the movable electrodes 6, 7, and 8, 9, there are a number of disadvantages to such a method. In the first place, the ratio of the movement of the contact surfaces to the electrode surfaces must be a straight-line function. This would necessitate a rather complicated set of gears and levers. As the instrument passes down the bore hole, it comes in contact with the well fluids and mud. Obviously, such materials in the gears would be detrimental, causing them to react unnaturally or not act at all. An attempt to seal off the gears so that such materials could not come in contact with the gears would be rather impractical because of the high pressures existing in the well. Near the bottom of the well, the pressure on the electrodes would be so great that the compression of the spring would be of no consequence. I, therefore, propose to employ hydraulic means, or hydraulic means plus a very simple lever to translate the movement of the contacting surface to the movable electrodes.

While the drawings show the movable electrodes as consisting of a pair of electrodes, a greater number (multiple of 2) may be used on each end of the logging device. In addition to the movable electrodes, stationary electrode 42 is located at the center of the apparatus. Although this electrode is not shown in Figures 1, 2, 3, and 4, it is shown in Figure 5.

As is illustrated in Figure 6, electrodes 7 and 8 are connected together as well as are 6 and 9. In operation the potential drop is determined between electrodes 6 and 9 and fixed electrode 42 and electrodes 7 and 8 and electrode 42; or in other words, the potential drop or differential between electrodes 6 and 7 is determined by the galvanometer.

Referring to Figure 6 the logging device adopted to be lowered into a well bore containing fluids can be supported by insulated cable 43. The cable 43 can be wound onto a reel 51 at the surface in a manner well known in this art. Thus the cable 43 passes over a measuring sheave on the reel as the logging device is moved through the well. A current source 45 which may be direct or alternating is connected through conductor 44 to the current electrode 42. Conductor 46 to current electrode 47 completes the circuit. Movable electrodes 6 and 9 and 7 and 8 are connected to the potential indicating device 50 by means of conductors 48 and 49, respectively. If desired, conductors 44, 48, and 49 may be contained in cable 43. The flexible guides 2 and 3 are constructed of any suitable material, preferably wear resistant and non-conducting or electrical insulating material.

Figure 8 is a plot of resistivity determinations vs. depth of the well illustrated in Figure 7. The solid line denotes those values obtained using the sonde of my invention and the broken line denotes those values calculated from a conventional log wherein the false assumption was made that the spacing-hole diameter ratio remained constant. There are two particular advantages resulting from the use of my sonde as compared to the prior art. First, the determinations made by my invention are more quickly obtained because there is no need for running a section gauge log as a correction to the electric log with a subsequent plotting of the results. Second, greater accuracy is obtained using my sonde. In substance, my sonde is provided with a caliper device so that diameter variations of the well bore cause a corresponding variation in the spacing of the electrodes with the result that the cell resistance varies as a function of the bore diameter. When the salinity of well fluid is constant, this electrode movement and consequent variations of the fluid resistance between electrodes is proportional to well bore variation. Use of such a cell in these conditions, therefore, applies to the direct potential measuring circuit, a corrective feature which offsets the effect on a primary resistivity log of well bore diameter variation to afford a corrected or modified resistivity log more accurately representing the true resistivity of the medium being investigated.

Other modes of applying the principle of my invention may be employed instead of the one explained, change being made as regards the method herein disclosed, provided the step or steps stated by any of the following claims or the equivalent of such stated step or steps be employed.

I, therefore, particularly point out and distinctly claim as my invention:

1. A logging device adapted to pass within a well bore containing well fluids, said device comprising a cylindrical frame, at least one fixed current electrode supported by said frame and a pair of movable potential measuring electrodes mounted longitudinally in respect to said frame exposed to the well fluid and included within an electrical circuit, elastic means forcing said pair of movable electrodes away from said fixed electrode, wall contacting means for following the contour of the bore hole, connecting means between said contacting means and said movable electrodes whereby a horizontal movement of said contacting means causes a vertical movement of said movable electrodes so that the ratio spacing between said fixed and movable electrodes to the bore hole diameter remains constant characterized further in that said electrodes are electrically insulated from the other parts of said logging device.

2. The apparatus of claim 1 wherein the connecting between the movable electrodes and the well contacting means is a combination mechano-hydraulic means.

3. A logging device adapted to pass within a well bore containing well fluids, said device comprising a cylindrical frame, at least one fixed current electrode supported by said frame and a pair of movable potential measuring electrodes mounted longitudinally in respect to said frame exposed to the well fluid and included within an electrical circuit, elastic means forcing said pair of movable electrodes away from said fixed electrode, flexible means for following the contour of the wall of the bore hole, connecting means between said movable electrodes and said flexible means whereby a horizontal movement of said flexible means causes a vertical movement of said movable electrodes so that the ratio spacing between said fixed and movable electrodes to the bore hole diameter remains constant characterized further in that said electrodes are electrically insulated from the other parts of said logging device.

4. In a well surveying device, an apparatus adapted to pass within a well bore containing well fluids said device comprising a cylindrical frame, an electrical circuit, at least one fixed current electrode supported by said frame and a pair of movable potential measuring electrodes mounted longitudinally in respect to said frame exposed to the well fluid and included within an electrical circuit, elastic means forcing said pair of movable electrodes away from said fixed electrode, wall contacting means for following the contour of the bore hole, connecting means between said contacting means and said movable electrodes whereby a horizontal movement of said contacting means causes a vertical movement of said movable electrodes so that the ratio spacing between said fixed and movable electrodes to the bore hole diameter remains constant characterized further in that said electrodes are electrically insulated from the other parts of said logging device and electrical indicating means at the surface, said electrical circuit including said electrodes and said electrical means.

5. In a well surveying device, an apparatus adapted to pass within a well bore containing well fluids said device comprising a cylindrical frame, an electrical circuit, at least one fixed current electrode supported by said frame and a pair of movable potential measuring electrodes mounted longitudinally in respect to said frame exposed to the well fluid and included within an electrical circuit, elastic means forcing said pair of movable electrodes away from said fixed electrode, flexible means for following the contour of the wall of the bore hole, connecting means between said movable electrodes and said flexible means whereby a horizontal movement of said flexible means causes a vertical movement of said movable electrodes so that the ratio spacing between said fixed and movable electrodes to the bore hole diameter remains constant characterized further in that said electrodes are electrically insulated from the other parts of said logging device, and electrical indicating means at the surface, said electrical circuit including said electrodes and said electrical means.

6. A well logging device comprising in combination a cylindrical body portion, a pair of potential electrodes supported at opposite ends of said cylindrical body portion and capable of relative movement with respect to each other, a well wall contacting means carried by said body resiliently urged outwardly and laterally from said cylindrical body portion in opposite directions, and interconnected so as to at all times maintain said cylindrical body portion centrally of the extremities of said contacting means, and means interconnecting said electrodes and said wall contacting means for changing the spacing between said electrodes in accordance with differences in the lateral extent of said wall contacting means.

References Cited in the file of this patent

UNITED STATES PATENTS

| | | |
|---|---|---|
| 2,102,080 | Kinley | Dec. 14, 1937 |
| 2,297,754 | Ennis | Oct. 6, 1942 |
| 2,392,357 | Bays | Jan. 8, 1946 |
| 2,415,636 | Johnson | Feb. 11, 1947 |
| 2,655,632 | Murphree | Oct. 13, 1953 |
| 2,704,347 | Doll | Mar. 15, 1955 |